United States Patent Office 2,957,343
Patented Oct. 25, 1960

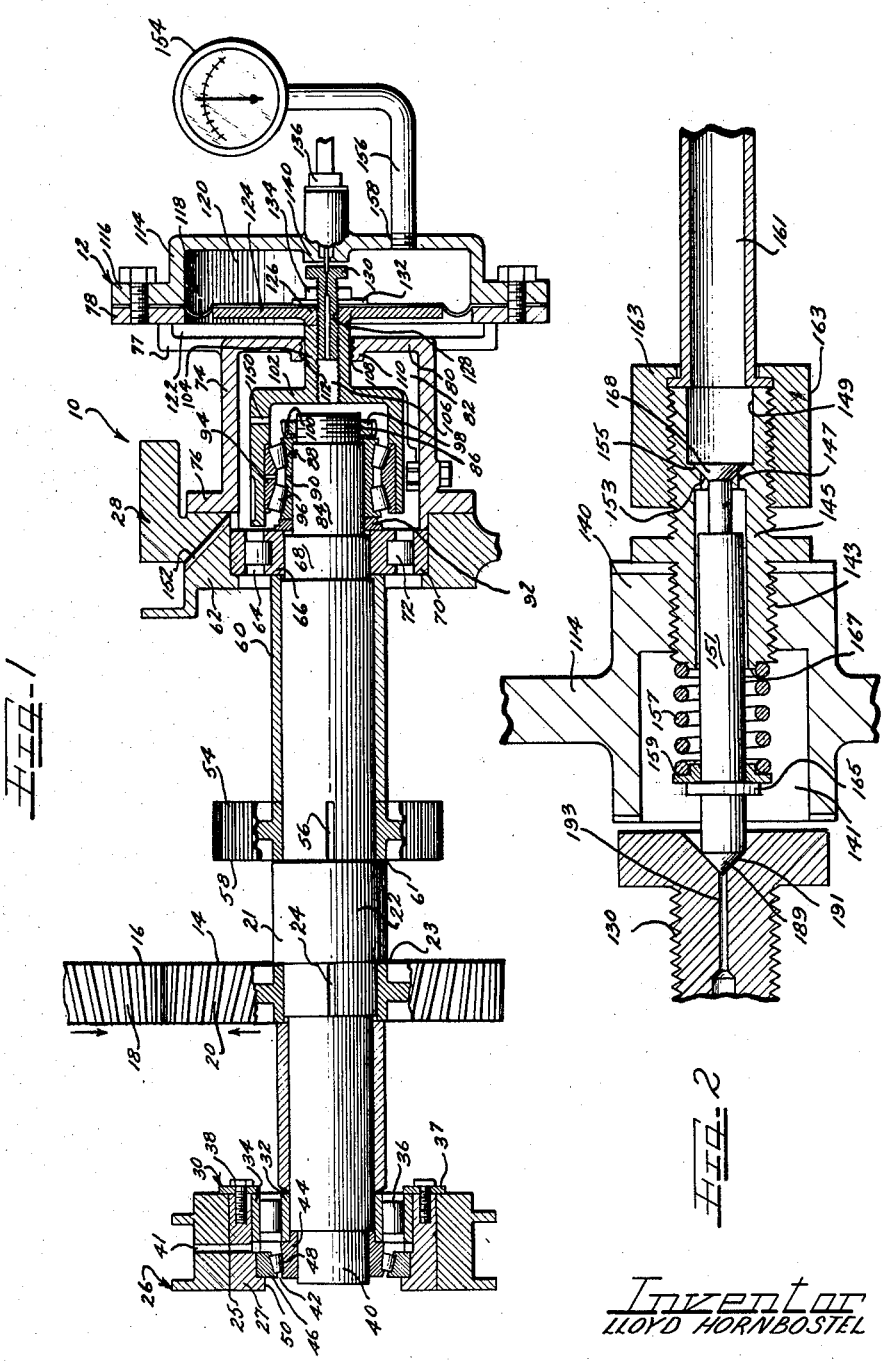

2,957,343
TORQUE INDICATING DEVICE

Lloyd Hornbostel, Beloit, Wis., assignor to Beloit Iron Works, Beloit, Wis., a corporation of Wisconsin Filed Dec. 7, 1956, Ser. No. 627,014

2 Claims. (Cl. 73—136)

This invention relates to apparatus for measuring torque transmitted through a mechanical drive system, and more particularly to the measurement of torque transmitted through a gear train.

In the operation of heavy machine systems handling continuous webs, such as paper machines and the like, it is particularly important to determine the amount of power applied at a particular driving station. In the event that an electric drive is employed, the power required may readily be determined by measuring the current and voltage applied to the driving motor. Where, however, a mechanical drive is utilized, the determination of the actual power transmitted has been difficult. In continuous web machines, such as paper machines and the like, the tension on the web must be determined with accuracy. This tension, of course, varies from point to point because of the change in the longitudinal dimension of the web resulting from changes in moisture content. Also, the tension of the web is intentionally increased to remove the web from the conventional Fourdrinier wire or from a roll. These tension variations in the web result in torque variations in the drive. Differential drives have been employed to compensate for such variations. In such drives, the need for determining the amount of power transmitted at particular points becomes even more important.

In conventional gear trains in which the gears are mounted on spaced parallel shafts and the gear teeth are arranged in parallel with the axes of the shafts, the force transmitted from one gear to the other is essentially a turning moment known as "torque." This is particularly true where the load forces are perpendicular to the axes of rotation of the shafts. In that case, very little, if any, thrust forces are developed. In the case of other gear systems having helical, bevel, or hypoid gears, considerable thrust may be developed. In a particular system, using helical gears for instance, the amount of thrust developed bears a definite relationship to the amount of torque transmitted. The present invention is directed to apparatus and method for measuring the thrust developed in a particular gear train, and thus the amount of torque transmitted.

Accordingly, a principal object of the present invention is to provide an efficient and effective apparatus for measuring torque in mechanical drive systems.

A further object of the present invention is to provide an improved drive mechanism wherein a first rotatable member is axially displaceable with respect to a second rotatable member as a result of a torque-transmitting drive connection between said members, the axial thrust being a predetermined function of the torque being transmitted between the first member and the second member.

A more particular object of the invention is to provide improved apparatus for measuring the torque transmitted to a shaft having a helical gear drive, and wherein the driven shaft is movable axially to a limited extent and in which pneumatic means are provided to effect an equal and opposite force so that the driven shaft is maintained in a given axial position and wherein the extent of the opposing force is indicative of the thrust developed and the torque transmitted.

Another object of the invention is to devise an improved method for determining the driving torque in a gear train which comprises mounting a driven shaft for limited axial movement and subjecting said shaft to an equal and opposite force, such as pneumatic pressure or the like, so that the shaft assumes an equilibrium position intermediate its axial limits of travel, and measuring variations in the pneumatic pressure required to restore the equilibrium position as an indication of the departure of the shaft from the equilibrium position as a result of torque load variations on said driven shaft.

Other objects, features and advantages will become apparent to those skilled in the art from the following detailed disclosure of a preferred embodiment of the instant invention, and the drawings appended hereto and made a part hereof.

On the drawings:

Figure 1 is a fragmentary sectional elevational view showing a torque indicating device made in accordance with the present invention;

Figure 2 is an enlarged fragmentary sectional elevational view of an air control apparatus forming a part of the device of Figure 1.

As shown on the drawings:

Referring now to the drawing, the reference numeral 10 indicates generally a drive mechanism embodying a torque indicating device made in accordance with the present invention, and indicated by reference numeral 12. The torque indicating device 12 includes a first member or gear 14, which in the present instance assumes the role of a driven gear, and a second member or gear 16 each being mounted for rotation. The gear 16 may be mounted on a drive shaft (not shown) and is shown as provided with helically formed teeth 18 for meshing engagement with similarly formed teeth 20 on the gear 14. The gear 14 may be fixed to a drive shaft 22 by means of suitable internal keys (not shown) which may be received in a keyway 24. The shaft 22 is journaled at one end in a bearing box 26 and at the other end in a bearing box 28. As will be noted, the gears 14 and 16 are arranged to direct axial thrust away from the bearing box 26 and towards the bearing box 28. For this purpose, the shaft 22 is provided with an enlarged portion 21 forming a shoulder 23 against which the gear 14 abuts.

The bearing housing or box 26 has the bore 25 thereof lined with a sleeve 27 in which is mounted a radial load carrying roller bearing assembly 30 accommodating limited axial movement of the shaft 22. The bearing assembly 30 includes an inner race 32 fixed to the shaft 22 and an outer race 34 between which are interposed a plurality of circumferentially spaced rollers 36. For securing the bearing assembly 30 in position with the bearing box 26, a ring 37, which abuts the outer edge of the race 34, is secured to the box 26 by means of a plurality of circumferentially spaced bolts 38.

The shaft 22 is provided at the left end, as viewed in Figure 1, with a reduced portion 40 which is journaled in a thrust bearing assembly 42. The thrust bearing assembly 42 includes an inner race 44 affixed to the reduced portion 40, and an outer race 46 spaced from the race 44 by a plurality of frusto-conical rollers 48. The left end of the bearing assembly 42 abuts against a shoulder 50 formed integrally with the sleeve 27 of the bearing box 26. By this arrangement, axial movement of the shaft 22 to the left, as viewed in Figure 1, is effectively precluded. Access to the bearing assemblies 30 and 42 for lubrication purposes is afforded by a passage 41.

A spur gear 54 may be affixed to the shaft 22 by means of internal keys (not shown) received in a keyway 56. The spur gear 54 is provided with straight teeth 58 for transmission of power without thrust to other gear arrangements. A spacing sleeve 60 is interposed between the spur gear 54 and the bearing box 28 and cooperates with a shoulder 61 formed by the enlarged portion 21 to maintain the gear 54 in position.

The bearing box 28 includes a housing 62 in which is mounted a conventional roller bearing assembly 64 comprising an inner race 66 fixed to a reduced portion 68 of the shaft 22 and an outer race 70 separated from the inner race 66 by a plurality of rollers 72.

The torque indicating device 12 includes a cylindrical housing 74 having an annular flange 76 secured to the housing 62 of the bearing box 28 by any suitable means. The outer end of the housing 74 has spiders or fingers 77 radiating therefrom and carrying an annular flange 78. The housing 74 has an end wall 80 separating the fingers from a chamber 82 within which extends progressively reduced portions 84 and 86 of the shaft 22. Mounted on the reduced shaft portion 84 is a ring 92 and a double thrust bearing assembly 88. The bearing assembly 88 includes an inner race 90 and an outer race 94. The ring 92 acts between the inner race 66 of the bearing assembly 64 and the inner race 90 of the bearing assembly 88. Both the inner race 90 and the outer race 94 have a pair of complementary race surfaces for rolling reception of frusto-conical rollers 96. The double thrust bearing assembly 88 is retained in position on the reduced portion 84 by means of a nut 98 held in position by a retainer 100. It will be noted that axial movement of the shaft 22 to the right, as viewed in Figure 1, is made possible but movement in the opposite direction is precluded.

A bell housing 102 is mounted on the outer race 94 in the chamber 82 so that it is movable axially with the shaft and bearing. The bell housing 102 has an integral shank 104 provided with a threaded bore 106 for a purpose hereafter described. An axial opening 108 surrounded by a shoulder 110 is formed in the end wall 80 for a reception of the shank 104. The opening 108 is so dimensioned with respect to the shank 104 as to form an annular passage 112 therebetween for a purpose that will be apparent.

At the right end of the torque indicating device 12, as viewed in Figure 1, is a cup-like housing 114 having an annular flange 116 which is secured to the flange 78 of the housing 74 by any suitable means. A flexible, impervious diaphragm 118 is secured in position within the enclosure thus formed by a clamping action between the confronting faces of the flanges 78 and 116. Thus, a chamber 120 is formed by the housing 114 and the diaphragm 118.

A disk 124 having a central hub 126 provided with a threaded axial bore 128 is secured to the shank 104 of the bell housing 102 by a cap screw 130. The diaphragm 118 is retained in engagement with the disk 124 by means of a retaining ring 132 held in position by a jam nut 134.

According to the present invention, a fluid such as air is introduced into the chamber 120 under pressure and exerts a force on the diaphragm 118 and the disk 124 and tends to urge the disk 124, the bell housing 102, and the shaft 22 to the left, as viewed in Figure 1, in opposition to the thrust of the shaft 22, to a position intermediate the travel limits of the shaft. The air is preferably introduced into the chamber 120 by means of a poppet valve 136, which may be actuated in a manner hereafter described to admit air as required.

The poppet valve 136 serves a dual function in that it not only controls the admission of air into the chamber 120, but also controls exhausting of air therefrom, as required. Referring now more particularly to Figure 2, the housing 114 has a boss 140 provided with a recess 141 and a threaded bore 143 communicating with the recess 141. A valve body 145 is threadedly received in the bore 143. The valve body 145 has a bore 147 communicating with a counterbore 149. Mounted axially within the bores 147 and 149 is a valve stem 151 which is provided at one end with a head 168 formed with a substantially frusto-conical surface 153 for engaging a correspondingly formed seat 155 at the right end of the valve body 145. The head 168 is normally retained in the position shown by means of a compression spring 157 which abuts at one end against a retainer ring 159 held in position by a snap ring 165, and at the other end by an outwardly extending annular flange 167 formed integrally with the valve body 145. At the left end of the stem 151, as viewed in Figure 2, is formed a conical head 189 which in the equilibrium position shown rests against a conical seat 191 in the capscrew 130. Upon movement of the capscrew 130 to the left, in a manner hereafter described, communication is afforded between the interior of the chamber 120 and the atmosphere through a passage 193 arranged axially of the capscrew 130 and joining the conical seat 191.

In normal operation, sufficient air pressure is maintained in the chamber 120 to hold the shaft 22 in an equilibrium position intermediate its axial limits of travel. Upon an increase in torque the thrust therefrom acts to move the shaft 22, along with its associated parts, to the right against the resisting force on the diaphragm 118. The valve stem 151, being in contact with the capscrew 130, also moves to the right to lift the head 168 of the stem 151 from the seat 155, and thus air is admitted from a supply conduit 161 which is secured in sealing relation to the valve body 145 by means of a nut 163. The air passes through an annular passage surrounding the stem 151, and thence into the chamber 120, until the pressure in the chamber effects a force which equals or slightly exceeds the thrust due to the increase in torque. This slight increase in pressure reverses the movement of the shaft 22 to restore the shaft to its equilibrium position.

Again assuming the shaft to be in the equilibrium position shown, a decrease in torque on the shaft 22 brings about a condition in which the axial thrust on the shaft is insufficient to balance the pressure on the diaphragm 118. As a result, the shaft 22 and its associated parts including the capscrew 130, move to the left. Since the valve stem 151 cannot move further to the left because the head 168 is seated on the seat 155, the passage 193 is opened to provide communication between the chamber 120 and the atmosphere through a bleed port 150 formed in the bell housing 102 and through the bearing assembly 64. The pressure changes within the chamber 120 may be indicated on a gauge 154 communicating with the chamber 120 through a conduit 156 externally threaded at 158 for reception in an opening in the housing 114. A passage 152 may be provided to lubricate the several bearing assemblies.

Upon subsequent movement of the shaft 22 to the right in response to axial thrust developed by the helical gear train, the head 189 of the stem 151 of the poppet valve 136 is again seated on the conical seat 191 and exhausting of air in the manner described is prevented. Since the air pressure in the chamber 120 is reduced, the capscrew 130 is free to urge the stem 151 to the right to unseat the head 168 and admit additional air. Air is admitted until the pressure on the diaphragm urges the capscrew 130 to the left to the equilibrium position shown.

Thus, one face of the diaphragm 118 is exposed to atmospheric pressure while the opposite face is exposed to pressure existing in the chamber 120 and this pressure is controlled by the axial position of the shaft 22.

As previously explained, the pressure of the air within the chamber 120 urges the shaft 22 to the left toward an equilibrium position while the shaft is subject to movement in the opposite direction by the axial force component developed by the torque transmission. Thus, the air pressure may be utilized, in installations characterized by inherent thrust, to support a thrust bearing. It will be understood that the increment of movement required of the capscrew 130 for the opening of the poppet valve 136 may be minute so that the indicating device 12 is instantly responsive to the slightest axial movement of the shaft 22.

It will be understood that other means may be employed for measuring the pressure within the chamber 120. For instance, if a permanent record is desired a continuous recorder responsive to variations in air pressure may be employed.

It will be understood that modifications and variations may be effected without departing from the scope of the novel concepts of the present invention.

I claim as my invention:

1. A gear drive comprising: a shaft rotatably mounted for limited axial movement; a pair of helical gears, one of said gears being rigidly mounted on said shaft and the other drivingly engaging said one gear to transmit torque therebetween and to effect axial thrust forces in said shaft proportional to said torque; a thrust bearing carried by said shaft at one end thereof; an axially-displaceable angularly-stationary cup-shaped housing receiving said one end of said shaft and said thrust bearing therein, said cup-shaped housing extending around said thrust bearing throughout its axial length for sole support thereby and having axial thrust engagement with said thrust bearing; said housing having an integral shank extending axially thereof away from said shaft; a second housing fixedly supported in radially spaced relation to said cup-shaped housing and having a flexible diaphragm peripherally secured thereto, said diaphragm being secured at its center to said shank and movable at its center therewith in response to variations in said thrust forces, and defining a pressure chamber within said second housing; a valve carried by said second housing and actuated in response to said axial shaft movement, wherein said diaphragm is also moved from a predetermined position, for admitting fluid under pressure to said chamber when the diaphragm moves in one direction in response to an increase of said thrust forces and for permitting escape of fluid therefrom when the diaphragm moves in the opposite direction from said predetermined position; and means for sensing and indicating the pressure in said chamber.

2. A gear drive comprising: a shaft rotatably mounted for limited axial movement; a pair of helical gears, one of said gears being rigidly mounted on said shaft and the other drivingly engaging said one gear to transmit torque therebetween and to effect axial thrust forces in said shaft proportional to said torque; a rigid housing fixedly supported in axially spaced relation to said shaft; a flexible diaphragm peripherally secured to said housing, and defining therewith a pressure chamber within said housing; a normally closed valve assembly secured to said housing and having an actuator extending into said pressure chamber, said valve assembly being adapted for connection to a fluid pressure source; a non-rotatable rigid means disposed intermediate one end of said shaft and said housing, said rigid means having a cup-shaped portion receiving said one end of said rotatable shaft and radially supported by said shaft for support of said rigid means, said cup-shaped portion having an axial thrust relationship with said shaft for joint axial movement, said rigid means having a tubular shank portion extending coaxially with and away from said shaft into substantially perpendicular engagement with said diaphragm outwardly of said chamber, the diaphragm-engaging portion of said shank portion being sized to back-up a substantial portion of said diaphragm and to displace the movable portion of said diaphragm into said pressure chamber in response to an increase in said thrust forces; screw means extending from said pressure chamber, through said diaphragm and threadably received by said tubular shank portion of said rigid means, and clamping said diaphragm to said rigid means, said screw means having an axial passage therethrough terminating in a seat for engaging said valve actuator to close said passage and to admit fluid pressure to said chamber in response to an increase of said thrust forces, and for being positioned away from said valve actuator to open said passage to release fluid pressure from said chamber through said shank portion in response to a decrease of said thrust forces; and means for sensing and indicating the pressure in said chamber.

References Cited in the file of this patent

UNITED STATES PATENTS

| | | |
|---|---|---|
| 1,272,041 | Herr | July 9, 1918 |
| 2,386,367 | Taylor | Oct. 9, 1945 |
| 2,444,363 | Newcomb | June 29, 1948 |
| 2,662,539 | Markson | Dec. 15, 1953 |
| 2,783,645 | Hornbostel | Mar. 5, 1957 |